W. E. FISHER.
EGG CRATE.
APPLICATION FILED SEPT. 27, 1918.

1,301,826.

Patented Apr. 29, 1919.

INVENTOR
WILLIAM E. FISHER

UNITED STATES PATENT OFFICE.

WILLIAM ERNEST FISHER, OF TORONTO, ONTARIO, CANADA.

EGG-CRATE.

1,301,826.   Specification of Letters Patent.   Patented Apr. 29, 1919.

Application filed September 27, 1918. Serial No. 255,954.

*To all whom it may concern:*

Be it known that I, WILLIAM ERNEST FISHER, of the city of Toronto, in the county of York, in the Province of Ontario, Canada, have invented certain new and useful Improvements in Egg-Crates, of which the following is the specification.

My invention relates to improvements in egg crates and the object of the invention is to devise a simple form of collapsible crate, which will take up a minimum amount of room for the purpose of shipment and which may be easily assembled and disassembled whenever required and it consists essentially of the following arrangement and construction of parts as hereinafter more particularly explained.

In the drawings like characters of reference indicate corresponding parts in the various figures.

Figure 1:
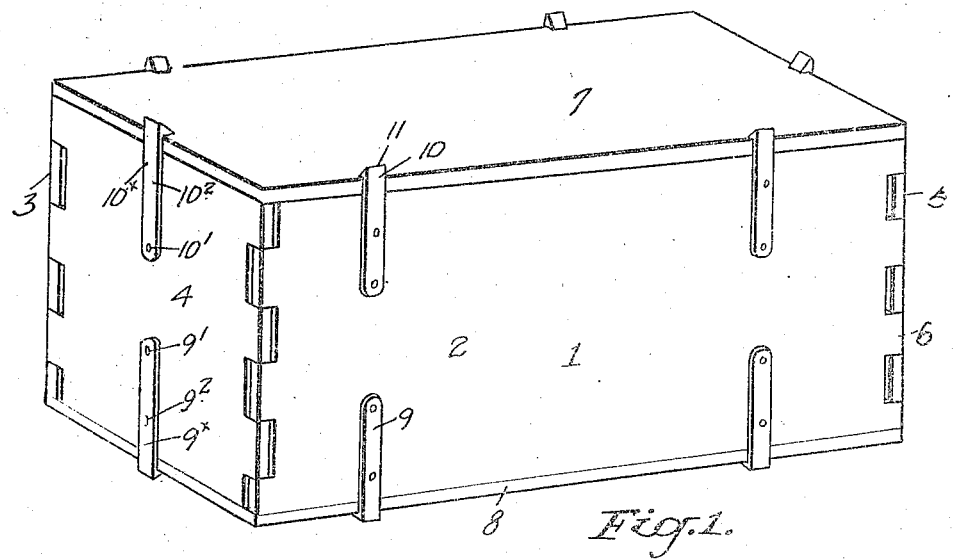
Figure 1, is a perspective view of my egg crate.

1 indicates the body of the crate, the sides 2 and 3 and ends 4 and 5 being hinged together at the corners as at 6. 7 indicates the top of the crate and 8 the bottom.

9 and 10 indicate a series of spring fingers secured to the sides and ends of the crate and extending beyond the upper and lower edges thereof and provided at their upper ends with ratchet shaped portions 11 facing inwardly. All the fingers 9 and 10 are rigidly secured in position with the exception of the fingers $9^x$ and $10^x$ which are secured in position at one end of the crate by a single rivet $9'$ and $10'$ and inwardly extending teats $9^2$ and $10^2$.

When it is desired to remove the top or bottom of the crate all that it is necessary to do is to pull the finger $9^x$ or $10^x$ outward so as to carry the teat $9^2$ or $10^2$ clear of the face of the crate end. The spring finger may then be swung to a horizontal position and the top or bottom 7 or 8 slid longitudinally of the crate so as to remove them. When the top and bottom are removed the crate sides and ends may be collapsed longitudinally and thus made compact for shipping.

Figure 2:
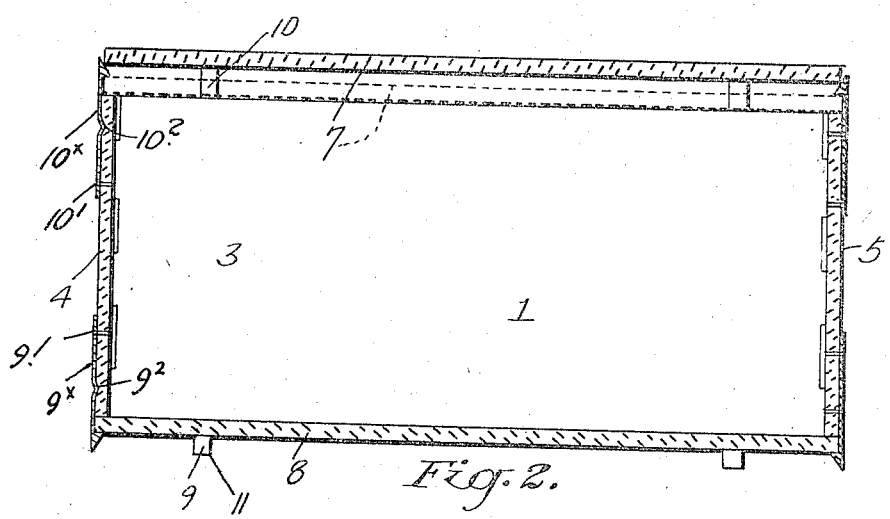
Fig. 2, is a longitudinal section therethrough.

When it is necessary to reassemble the crate all that it is necessary to do is to swing the sides and ends into a rectangular position, place the bottom of the crate against the corresponding fingers 9 in a position such as shown in Fig. 2 and then press downwardly upon the top so as to spring the fingers simultaneously outwardly allowing the bottom to spring into the position indicated by dotted lines in Fig. 2. The top may be placed in position by a similar operation.

From this description it will be seen that I have devised a very simple form of crate particularly adaptable for use as an egg crate, which will be readily collapsible and be compact for shipment and almost instantaneously set up for use.

What I claim as my invention is.

1. An egg crate comprising sides and ends hingedly connected together, spring fingers extending outwardly from the edges of the crate and having ratchet-shaped upper ends, and top and bottom members adapted to engage such ratchet-shaped upper ends so as to spring them simultaneously outward to allow the top and bottom members to pass beneath the ratchet-shaped ends against the top and bottom of the crate.

2. An egg crate comprising sides and ends hingedly connected together, spring fingers extending outwardly from the edges of the crate and having ratchet-shaped upper ends, top and bottom members adapted to engage such ratchet-shaped upper ends so as to spring them simultaneously outward to allow the top and bottom members to pass beneath the ratchet-shaped ends against the top and bottom of the crate, and an end finger adapted to be swung horizontally to allow of the longitudinal withdrawal of the top and bottom members.

WILLIAM ERNEST FISHER.

Witnesses:
  B. BOYD,
  N. CARTER.

Copies of this patent may be obtained for five cents each, by addressing the "Commissioner of Patents, Washington, D. C."